US006828363B2

(12) United States Patent
Beuermann et al.

(10) Patent No.: US 6,828,363 B2
(45) Date of Patent: Dec. 7, 2004

(54) PROCESS FOR THE PREPARATION OF POWDER COATING COMPOSITIONS

(75) Inventors: Sabine Beuermann, Goettingen (DE); Michael Buback, Bovenden (DE); Michael Juergens, Goettingen (DE); Eckhard Weidner, Bochum (DE); Marcus Petermann, Bochum (DE); Christian Schwede, Wuppertal (DE); Peter Klostermann, Wuppertal (DE)

(73) Assignee: E.I. du Pont de Nemours and COmpany, Wilmington, DE (US)

( * ) Notice: Subject to any disclaimer, the term of this patent is extended or adjusted under 35 U.S.C. 154(b) by 268 days.

(21) Appl. No.: 09/935,619

(22) Filed: Aug. 23, 2001

(65) Prior Publication Data

US 2002/0052456 A1 May 2, 2002

(30) Foreign Application Priority Data

Oct. 31, 2000 (DE) .......................... 100 54 114

(51) Int. Cl.$^7$ ................................. C08K 3/00
(52) U.S. Cl. ...................... 524/81; 524/80; 523/340; 523/347
(58) Field of Search ................ 524/81; 523/340, 523/347

(56) References Cited

U.S. PATENT DOCUMENTS

| 5,328,972 A | 7/1994 | Dada et al. |
| 5,506,317 A | 4/1996 | DeSimone et al. |
| 5,530,077 A | 6/1996 | DeSimone et al. |
| 5,552,502 A | 9/1996 | Odell et al. |
| 5,663,237 A | 9/1997 | Lee et al. |
| 5,824,726 A | 10/1998 | DeSimone et al. |
| 6,056,791 A | 5/2000 | Weidner et al. |
| 6,057,409 A | 5/2000 | Cunningham et al. |
| 6,340,722 B1 * | 1/2002 | Lee et al. .................. 524/428 |

FOREIGN PATENT DOCUMENTS

| DE | 17 45 386 | | 3/1972 |
| DE | 36 09 829 | A1 | 9/1987 |
| DE | 19909944 | | 10/1999 |
| EP | 0 136 813 | | 10/1985 |
| EP | 220503 | | 5/1987 |
| EP | 0 239 035 | A2 | 9/1987 |
| EP | 0 301 532 | A2 | 2/1989 |
| EP | 0 590 842 | A2 | 4/1994 |
| EP | 0 669 858 | | 9/1995 |
| EP | 0735051 | A1 | 10/1996 |
| EP | 0744992 | | 10/1997 |
| EP | 0 806 438 | A2 | 11/1997 |
| EP | 0 964 009 | A1 | 12/1999 |
| JP | 8-104830 | | 4/1996 |
| JP | 2001-151802 | | 6/2001 |
| WO | WO 93/20116 | A1 | 10/1993 |
| WO | WO 94/09913 | | 5/1994 |
| WO | WO 95/21688 | | 8/1995 |
| WO | WO 95/34606 | A1 | 12/1995 |
| WO | WO 96/28477 | A1 | 9/1996 |
| WO | WO 28351 | A1 | 7/1998 |
| WO | WO 98/34967 | A1 | 8/1998 |
| WO | WO 99/24493 | | 5/1999 |
| WO | WO 00/05273 | A1 | 2/2000 |
| WO | WO 01/57095 | A1 | 8/2001 |

* cited by examiner

Primary Examiner—Edward J. Cain
(74) Attorney, Agent, or Firm—Steven C. Benjamin

(57) ABSTRACT

The invention relates to a method of preparation for polymers, particularly binders for powder coatings and powder coatings which are prepared as a solution in a supercritical fluid phase. Binders for powder coatings are prepared from at least two ethylenically unsaturated monomers capable of free-radical or ionic copolymerization, and conventional initiators and regulators in supercritical fluids, whereby polymerization is carried out in the homogeneous phase, and, after the reaction has ended, either the composition or the phase parameters of the mixture are altered so that at least two phases with supercritical fluid are obtained, and the phase containing predominantly polymer is separated and the polymer is separated as a powder from the sc fluid by depressurization or the polymer phase is further processed under supercritical phase conditions to the powder coating.

26 Claims, 3 Drawing Sheets

PROCESS FOR THE PREPARATION OF POWDER COATING COMPOSITIONS

FIELD OF THE INVENTION

The invention relates to a method of preparation for polymers, particularly binders for powder coatings, and powder coatings which are prepared as a solution in a supercritical fluid phase.

BACKGROUND OF THE INVENTION

Processes for the preparation of polymers using solvents in the supercritical (sc) state, particularly sc $CO_2$, are already known in the literature. In these processes, monomers or oligomers are dissolved in supercritical solvents and then allowed to react. The resulting polymers are usually insoluble in the supercritical solvent and form two-phase systems. High molecular weights may be obtained with this method of preparation. Such processes are already described, e.g., in U.S. Pat. No. 5,328,972, in which, however, only about 20 wt-% of monomers are present in sc $CO_2$, in EP 0 735 051, which describes a process for polymerisation in supercritical solvents in which homopolymers or copolymers of thermoplastic resins are prepared, in EP 0 220 603, in which polymers in powder form based on special unsaturated vinyl compounds are prepared in sc $CO_2$. In these processes which use, in principle, a large proportion of supercritical solvents, particularly $CO_2$, it is known that resulting polymers are no longer dissolved homogeneously in the fluid phase in the required reaction conversions. A disadvantage of reactions in this phase (emulsion polymerisation, dispersion polymerisation) in supercritical media is the use of expensive stabilisers. Moreover, problems may occur in controlling and conducting the reaction.

Moreover, processes are known in which polymers are liquefied by means of a solvent in the supercritical state, e.g., sc $CO_2$, under pressure and at elevated temperature, wherein hardeners and additives may optionally be introduced into the mixture in the resulting viscous phase and the mixture under pressure is then depressurised in order to obtain materials in powder form and powder coatings. Examples of such processes are described in EP 669 858, WO 99/24 493, and EP 0 744 992 in which a process for the preparation of particles and powders is described with depressurisation of a viscous mixture of the substance to be converted to a powder and a supercritical solvent.

These processes operate according to the sequence whereby the polymer or the individual components of a polymer mixture must be melted, impinged on by the supercritical solvent and homogenised and, after the optional addition of further components, the corresponding powder is obtained after a depressurisation step. A known disadvantage is that of fresh process steps of melting and homogenising the resin material with the supercritical solvent. This is associated with exposure to high temperatures which, if reactive components are used, may lead to side reactions and hence to the unusability of the material.

SUMMARY OF THE INVENTION

The object of the invention is to provide a process in which, starting from monomers capable of free-radical or ionic polymerisation and which may be mixed homogeneously in sc fluids, a homogeneously dissolved polymer is produced and this is separated from the supercritical phase.

A further object is to provide a process in which, after the polymer has been prepared, said polymer is further processed directly without leaving the supercritical phase state, and hardeners, additives and further components are added in the fluid state and the viscous/fluid mixture is then depressurised in order to obtain an uncross-linked powder coating in powder form.

It has become apparent that the object may be achieved by the process according to the invention for the preparation of binders for powder coatings from at least two ethylenically unsaturated monomers capable of free-radical or ionic copolymerisation and conventional starters and regulators in sc fluids, characterised in that polymerisation is carried out in the homogeneous phase, after the reaction has ended either the sc fluid content is increased or the phase parameters (pressure, temperature) of the mixture are altered so that at least two phases with supercritical fluid are obtained, a polymer phase (I) saturated with sc fluid and a second phase (II) containing substantially sc fluid and monomer, and the polymer phase is separated and the polymer is separated as a powder from the sc fluid by depressurisation.

A further embodiment of the invention separates phase II monomers/sc fluid from the two supercritical phases, mixes the remaining homogeneous phase I polymer/sc fluid with further components such as additives, auxiliaries and hardeners at a temperature at which no cross-linking reactions occur, and the resulting fluid mixture is converted to a solid in powder form by depressurising the sc fluid.

DETAILED DESCRIPTION OF THE INVENTION

Figure 1:
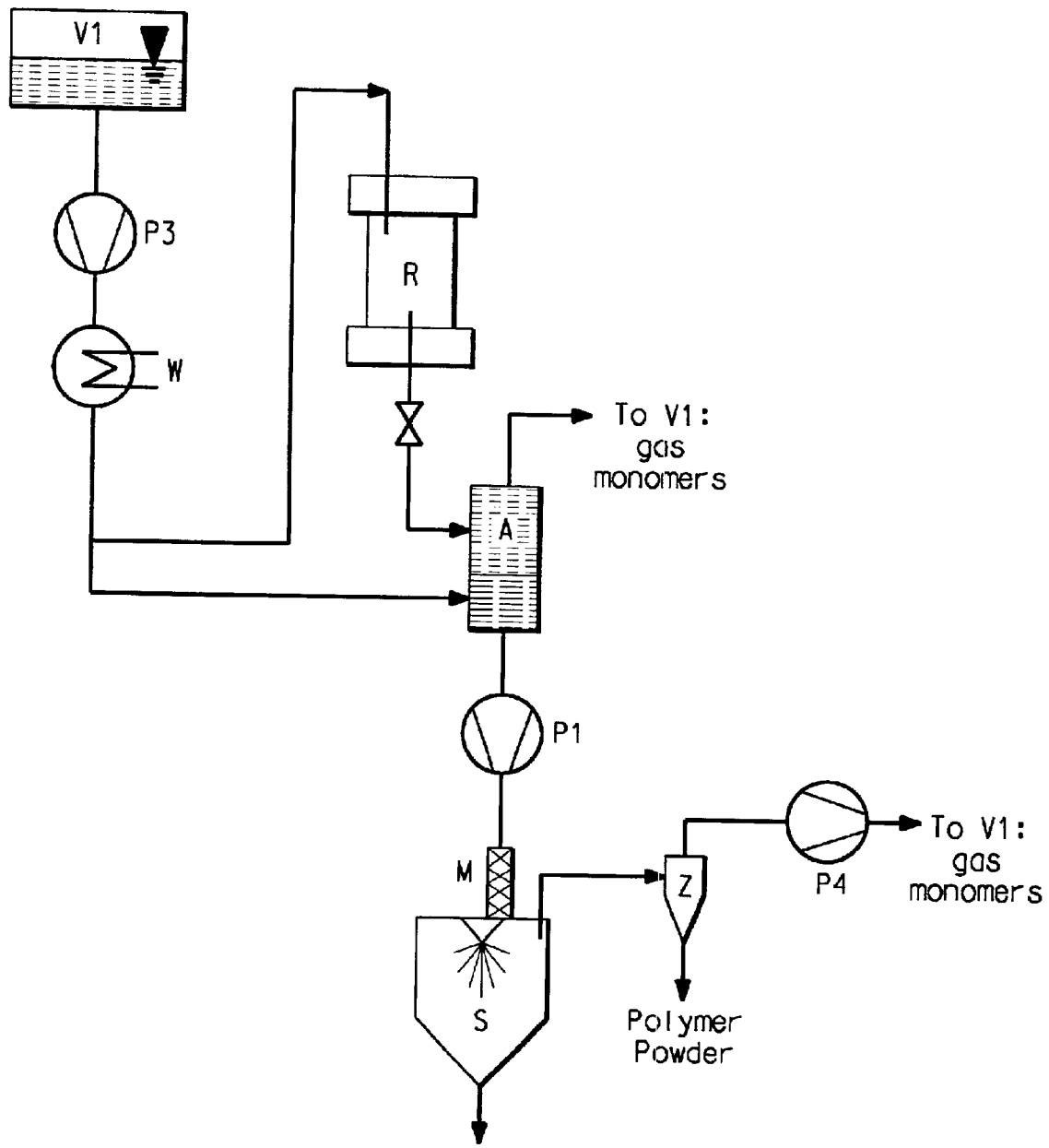
FIG. 1 illustrates a process for the preparation of a polymer in the homogeneous phase, separation of the phases I (sc fluid/polymer) and phase II (monomers/sc fluid) and separation of the polymer powder.

A further embodiment of the invention recycles the separated phase of unreacted monomers/sc fluid to the reaction mixture for polymerisation.

A further embodiment of the invention does not depressurise the sc phase I into air but carries out depressurisation into an organic liquid or water.

The term supercritical (sc) fluids refers hereinafter to gases, vapours, liquids or mixtures of these substances which, under the physical conditions applied, are in a near-critical or supercritical state and in which the monomers, additives, polymers and further components of the polymerisation reaction may be obtained homogeneously. Phases of sc fluids and monomers, polymers or further components are called sc phases. In the process according to the invention, various gases or liquids may be used at reaction temperature as the sc fluid, e.g., carbon dioxide, dinitrogen oxide; hydrocarbons such as methane, ethane, ethylene, propane, propylene, butane, cyclohexane, toluene, benzene; ethers such as dimethyl ether, tetrahydrofuran; ketones such as acetone, methyl ethyl ketone, halogenated hydrocarbons such as $CClF_3$, $CH_3F$; alcohols or ammonia. More particularly, however, fluids which are non reactive under the polymerisation conditions are suitable, particularly methane, ethane, propane, butane, dinitrogen oxide, dimethyl ether and carbon dioxide; non combustible substances are more particularly preferred, particularly carbon dioxide or dinitrogen oxide. Mixtures of two or more of the components may also be used.

Examples of suitable polymerisable monomers include unsaturated monomers capable of free-radical polymerisation such as styrene, vinyltoluene, α-methylstyrene, p-methylstyrene, p-methoxystyrene, p-tert. butylstyrene; linear or branched vinyl esters of aliphatic carboxylic acids such as vinyl acetate, vinyl propionate, versatic acid vinyl ester; vinyl ethers such as methyl-, ethylvinyl ethers; (meth) acrylonitrile, (meth)acrylamide; esters and amides of α,β-unsaturated mono- or dicarboxylic acids such as crotonic acid, isocrotonic acid, itaconic acid, fumaric acid, maleic acid, tetrahydrophthalic acid, branched or unbranched alkyl (meth)acrylates such as methyl (meth)acrylate, ethyl (meth)acrylate, propyl- or isopropyl (meth)acrylate, pentyl (meth)acrylate, isomeric butyl (meth)acrylate, hexyl (meth)acrylate, isomeric octyl (meth)acrylate, decyl (meth)acrylate, dodecyl (meth)acrylate, stearyl (meth)acrylate; alicyclic $C_5$ to $C_{12}$-alkyl (meth)acrylic esters such as cyclopentyl (meth)acrylate, cyclohexyl (meth)acrylate, methylcyclohexyl (meth)acrylate, isobornyl (meth)acrylate, norbornyl (meth)acrylate, tert-butylcyclohexyl (meth)acrylate, trimethylcyclohexyl (meth)acrylate; or functionalised monomers such as glycidyl (meth)acrylate, 1,2-epoxybutyl (meth)acrylate, 2,3-epoxycyclopentyl (meth)acrylate, (meth)allyl glycidylether, 3,4-epoxy-1-vinylcyclohexane, hydroxyethyl (meth)acrylate, isomeric hydroxypropyl (meth)acrylate, butane diol monoacrylate, hydroxyhexyl acrylate, hydroxyoctyl acrylate, dialkylaminoalkyl (meth)acrylamide, isomeric hydroxybutyl (meth)acrylate; reaction products of glycidyl (meth)acrylate with acetic acid, propionic acid, butyric acid, acrylic acid, methacrylic acid, itaconic acid, crotonic acid, aconitic acid, half esters of maleic or fumaric acid, N-alkoxyalkyl (meth)acrylamide such as N-methylol (meth)acrylamide etc. Suitable copolymerisable monomers are described for example in DE 199 09 944. The corresponding monomers should be substantially ethylenically monofunctional and lead to linear polymers. In specific cases, small proportions of difunctional monomers may also be present. The monomers may be selected according to the desired properties of the polymer. If only monomers without additional functional groups are selected, uncross-linked polymers are obtained, but proportions of the monomers should preferably contain further functional groups such as epoxy groups, OH groups, carboxyl groups etc. so that cross-linkable polymers are obtained. Depending on the choice of functionalised monomers, externally cross-linking or self-cross-linking binders may be obtained. Care should be taken to ensure that under the reaction conditions of polymerisation, a reaction with the sc fluid or with the complemetary reactive group is avoided.

More particularly, it is advantageous for powder coating applications to obtain a glass transition temperature of the polymers ($T_g$) of >+30° C. (determined by DSC, Differential Scanning Calorimetry), particularly >+40° C. The $T_g$ may be influenced by the choice of monomers. Suitable compositions are already described in the literature and may be selected and adjusted accordingly by the skilled person.

The well known radical or ionic initiators may be used as initiators for polymerisation in sc fluid. Examples of such initiators include azo compounds such as azobisisobutyronitrile (AIBN), peroxides such as benzoyl peroxide, tert-butyl hydroperoxide, tert-amyl perbenzoate, di-tert butylperoxide, peroxyformic acid or other peracids, chlorine- and fluorine-based percompounds which are soluble in the sc medium such as trichloroacetyl peroxide, bis (perfluoro-2-propoxypropionyl)peroxide and $H_2O_2$. It is possible to reduce the activation energy of peroxide decomposition and hence increase the rate of decomposition at low temperatures by adding reducing agents. Examples thereof include sodium hyposulfite; readily enolisable carbonyl compounds such as ascorbic acid, hydroxyacetone; metal ions such as $Cu^+$, $Fe^{2+}$, $V^{2+}$, $Co^{2+}$; amines such as N,N-dialkylaniline. Optionally, other additives may also be contained, e.g., regulators such as Co-complexes, mercaptans, inhibitors etc, but preferably no emulsifiers should be added to the mixture.

The polymers prepared by the process according to the invention comprise preferably at least three copolymerisable monomers, preferably at least one monomer containing one further reactive group which is stable under the polymerisation conditions in addition to the unsaturated group.

Optionally, it may be advantageous to add proportions of one or more organic cosolvents to the sc fluid in order to obtain improved compatibility of polymer, monomer and sc fluid. The choice should be tailored to the monomer composition. Examples thereof include ketones, such as acetone, methylisobutyl ketone, methyl ethyl ketone; alcohols such as ethanol, iso-propanol, butanol; ethers such as diethyl ether, dibutyl ether, tetrahydrofuran; esters such as butyl acetate, ethyl acetate or aromatic solvents. The cosolvents should have a low boiling point and their proportion should be max. 20 wt-% of the sc fluid, preferably max. 10%.

The monomers are mixed homogeneously with the sc fluid under the process conditions or, after mixing, converted to the supercritical homogeneous state, optionally further additives and initiators and proportions of cosolvents are added and mixed homogeneously, and then polymerisation is initiated. The reaction may be initiated by elevated temperature or by other methods such as, e.g., by UV radiation or the addition of redox catalysts. The corresponding conditions are well known and selected according to the initiator used.

The sc fluid content of the mixture, e.g., preferably CO2, may be up to 75 wt-%, preferably up to 37.5 wt-%, particularly up to 25 wt-%. In the event of a higher sc CO2 content, the solubility of the polymer is generally low so that only a low conversion may be obtained. If the sc CO2 content selected is too low, a substantial increase in viscosity of the reaction mixture is noticed and it is difficult to ensure an advantageous molecular weight distribution. The reaction time is from 5 to 240 minutes, particularly from 10 to 150 minutes.

The temperature and pressure of the reaction mixture should be above the critical point of the sc fluid, in the case of sc CO2 above 31.4° C. and 72.9 bar. For other sc fluids, the corresponding values are described in the literature. The temperature is raised until a sufficient rate of polymerisation of the monomers is obtained, for example, from 70 to 250° C., particularly from 80 to 200° C., particularly preferably from 100 to 150° C. The pressure of the reaction mixture is above the critical pressure of the sc fluid. Optionally, it may be up to 2000 bar, but a pressure from 80 to 450 bar, particularly up to 350 bar is preferred.

The number-average molecular weight ($M_W$) of the polymer is adjusted to 2,000 to 12,000, particularly from 3,000 to 9,000. The reaction is conducted until a homogeneous mixture of the resulting polymer in the mixture of monomers and sc fluid is ensured. The conversion may be from 25 to 100%, preferably from 40 to 95%. The reaction mixture should be homogeneous, i.e. sc fluid, optionally additional solvents, monomer mixture and polymer form one phase. The homogeneity may be ascertained by measuring turbidity, by visually monitoring the mixture, or by spectroscopic measurement. It also depends on the pressure of the reaction mixture. The reaction is ended before nonhomogeneity occurs, i.e. precipitation of the polymer, e.g., by lowering the temperature, lowering the pressure, by adding sc fluid or by a combination of these measures. The mixture is still in the sc state but nonhomogeneities may also occur after the reaction has ended. The resulting polymer has a narrow molecular weight distribution and a low dispersity D ($M_W:M_N$), generally D<3, particularly D<2.

After the reaction has ended, the pressure may be reduced and the temperature lowered. For example, the reaction mixture may be converted directly to a polymer powder by spraying. In so doing, other volatile constituents present are generally also converted to the gas phase and removed. In that case a polymer powder is obtained directly. It is possible for this powder to undergo further process steps, e.g., a treatment under vacuum in order to reduce the residual content of volatile constituents.

Preferably, however, it is possible to bring about a phase separation into several, preferably two sc phases in the reaction mixture. This may be achieved by altering the temperature and/or altering the pressure, or further sc fluid is added to the mixture whereby a phase separation may occur, i.e. a fluid phase I is obtained comprising predominantly polymer and sc fluid, and a further fluid phase II comprising predominantly monomers and sc fluid. The phase I with the polymers is separated. This phase still containing sc fluid and optionally proportions of cosolvents or monomers may be further processed by known methods. For example, the sc fluid may be separated by depressurisation, as described above. In so doing, the cosolvents and other volatile constituents are generally also separated with the sc fluid from the polymer powder by the separation.

Optionally, it is also possible to add to the separated phase I of polymer/sc fluid, mix and optionally dissolve a quantity of sc fluid, if need be once or several times. Remaining monomers or cosolvents may be removed from the polymer by removing and depressurising the sc fluid in each case. It is also possible to extract phase I and a phase of an identical or different sc fluid continuously in the countercurrent process and thus to separate monomers and/or accompanying products.

The polymerisation reaction may be carried out batchwise or continuously. A preferred embodiment recycles the separated phase II of monomers/sc fluid to the reaction mixture, particularly in a continuous mode of operation. The consumed participants in the reaction, e.g., monomers or initiators, are made up with a corresponding aliquot, or accompanying substances are removed first from the sc fluid before reuse.

The reaction may be carried out in suitable reaction vessels, e.g., a batch reactor, a continuously operated stirred reactor, a cascade of stirred reactors, or a flow tube reactor which are provided with the necessary metering, temperature, pressure and control facilities.

After depressurisation of phase 1, comprising the polymer and the sc fluid, and separating the sc fluid, the obtained polymer particles may be manufactured as powder coating compositions by well known techniques such as , e.g., the extruder process.

Other well known processes for the manufacture of powder coating compositions are e.g. the method of ultrasonic atomisation, method under assistance of sc fluids, as described e.g. in WO 99/24 493, method of steam assisted micronisation.

Further components which are suitable for use in the powder coating may be added to the polymer partikel and/or during the processes. Examples of such components include hardeners, additives such as stabilisers, levelling agents, degassing agents, light stabiliser, dyes, pigments and extenders. Such substances are already described in the literature and they may be selected and added according to the given application of the powder coating.

A further, particularly preferred embodiment of the invention is that of separating the sc phase I and continuously carrying out the process for the preparation of a powder coating under supercritical process conditions and finishing in conventional manner.

The phase I/polymer/sc fluid obtained may be mixed with additional sc fluid. Further components which are suitable for use in the powder coating may be added to this mixture ("process mixture") by known methods. Examples of such components include hardeners, additives such as stabilisers, levelling agents, degassing agents, light stabiliser, dyes, pigments and extenders., which are well known and which may be selected and added according to the given application of the powder coating.

These components may be metered directly into the process mixture; optionally, it is also possible to lower the viscosity of polymer components in the form of a mixture with identical or different sc fluids and then to meter them into the process mixture, as described, e.g., in WO 99/24493. Mixing may take place with inherently known devices and methods, e.g. static mixers. Further possibilities of homogenisation and particle formation include, e.g., ultrasonic sources, or a mixture may be obtained by means of a suitable flow system, e.g., by tangential flows, jet flows or impact flows. Such methods are described, for example, in WO 95/21 688 or in WO 99/24 493.

A particular embodiment adds a hardener to the process mixture which hardener may preferably also be mixed with sc fluid before being mixed with the polymers. Externally cross-linking coating systems are obtained in so doing. Hardeners for powder coating binders are already generally well known. For example, they are solid, low molecular weight or polymer compounds having two or more carboxyl groups or anhydride groups per molecule. Further examples include carboxy-functional oligo- and polyesters or oligo- and polyurethanes. The hardener component should optionally be tailored to the corresponding reactive groups of the polymer. The temperature of the mixture of hardener/polymer should be below the reaction temperature of the cross-linking reaction. The viscosity of the process mixture may be influenced by the amount of sc fluid.

The subsequent process step of depressurising the process mixture to obtain the powder coating may take place in various ways. For example, the mixture may be depressurised by means of a nozzle in a short period of time, or a time-dependent depressurisation is carried out inside a pressure vessel. Due to depressurisation, the resulting particles are cooled to below their solidification temperature and the primary particle distribution obtained during the depressurisation process remains in tact since subsequent sintering of the powders is avoided. The particle size of the powder coating particles may be influenced by a suitable choice of process parameters, e.g., pressure, temperature, flow rate, type of nozzle, diameter of nozzle, viscosity, concentration of the solution under pressure. These particles generally have a diameter from 1 to 150 μm, particle sizes below 50 μm being preferred, particularly from 10 to 30 μm.

While the sc fluid is being removed it is possible to remove further volatile constituents optionally contained in the mixture.

A further embodiment does not spray the process mixture into a gas atmosphere but atomisation takes place into a liquid phase, e.g., into an aqueous phase. Additives may optionally be contained in this liquid phase. A preferably aqueous slurry of a powder material is thus obtained.

Figure 2:
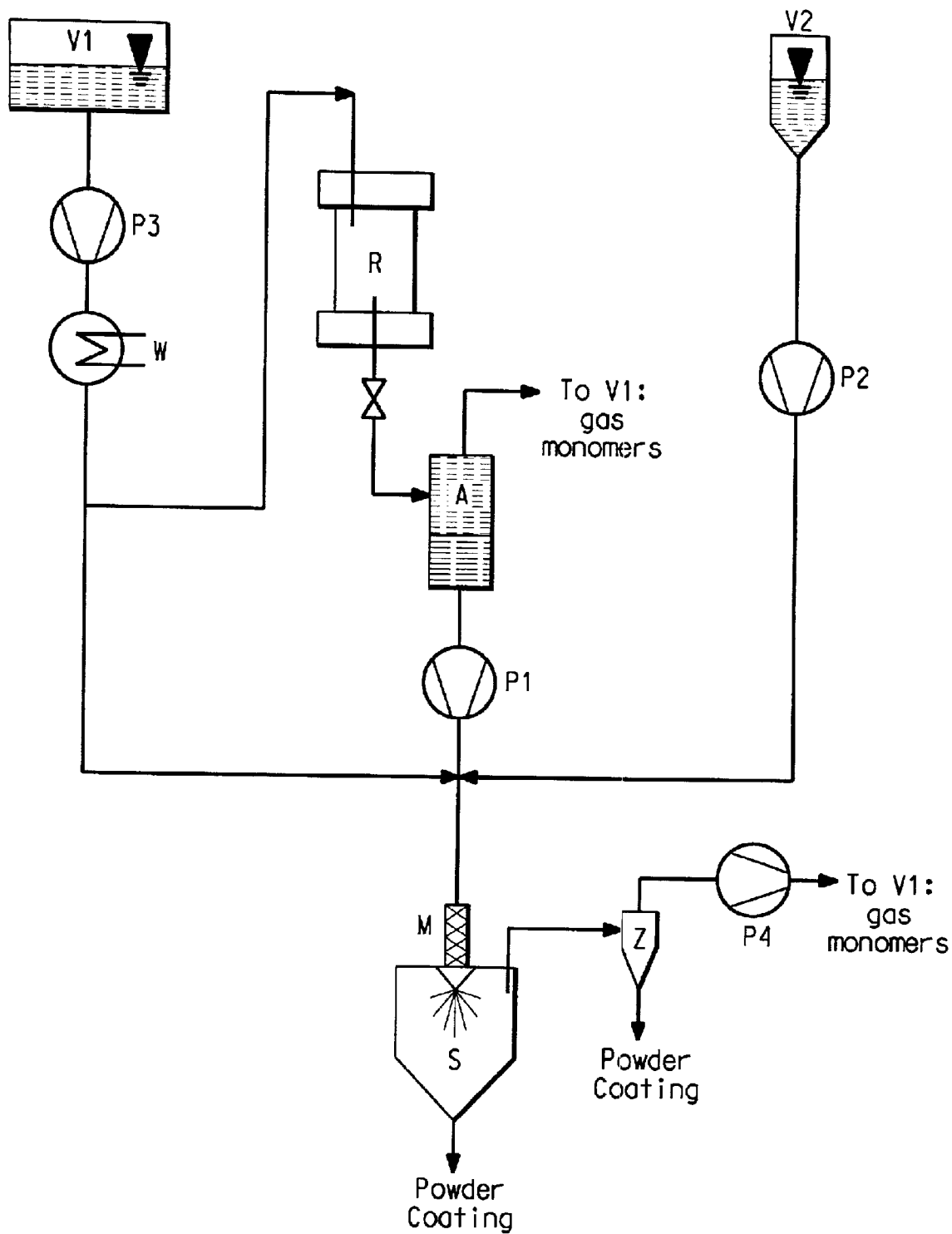
FIG. 2 illustrates a process in which the process is supplemented by the additional step of adding hardeners and/or additives.

Variants of the way in which the process is conducted are shown diagrammatically by way of example in the drawings. FIG. 1 shows a process for the preparation of a polymer in the homogeneous phase, separation of the phases I (sc fluid/polymer) and phase II (monomers/sc fluid) and separation of the polymer powder. FIG. 2 shows a process in which the process is supplemented by the additional step of adding hardeners and/or additives.

Figure 3:
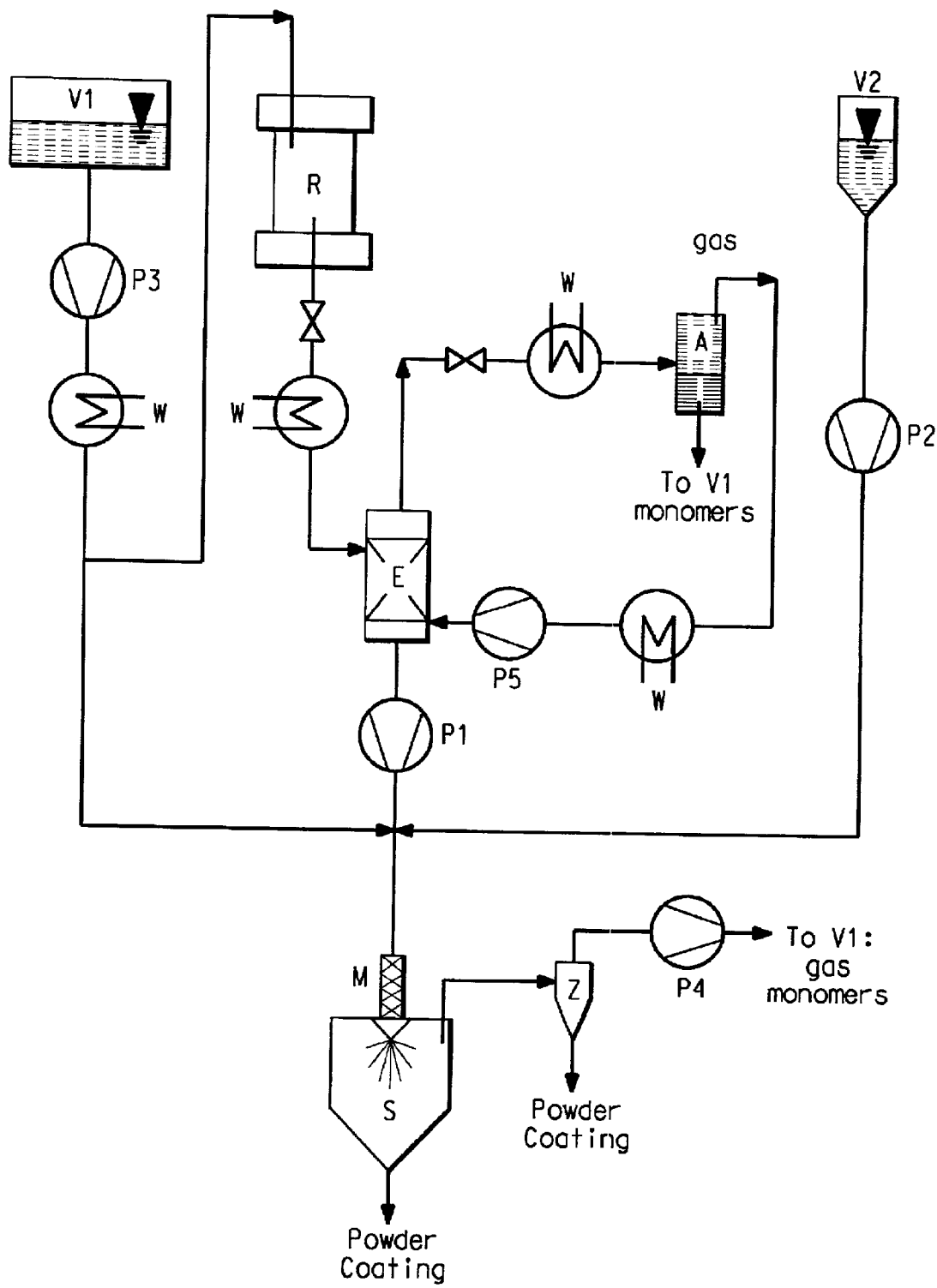
FIG. 3 illustrates a process in which, in addition, the process step of extraction of residual monomers and accompanying substances from phase I is carried out and the sc fluid is recycled.

FIG. 3 shows a diagram of the process in which, in addition, the process step of extraction of residual monomers and accompanying substances from phase I is carried out and the sc fluid is recycled. The product obtained in this case after further components have been added is a powder coating. V1 means a storage vessel for sc fluid, in this case sc $CO_2$ and monomers, V2 means a storage vessel for hardener, optionally with sc fluid. W represents a heat exchanger for appropriate control of the process heat, R is the reactor and P1 to P5 mean pumps for conveying sc fluid or process mixture. The separator A separates two supercritical phases (polymer-rich and monomer-rich). In the static mixer M the process mixture is homogenised and in spray tower S phase I is sprayed and a polymer powder or powder coating is obtained. Z represents a cyclone for purifying the gaseous constituents which separates proportions of the product and the gaseous constituents. E represents a counter-current extraction plant for working up phase II. The sc extraction phase is recycled and monomer constituents are separated.

The product obtained is either a polymer powder or a complete powder coating if hardener and optionally further components are added to the product.

The process according to the invention may be carried out both continuously and batchwise. By means of an appropriate arrangement of equipment it is possible to avoid cost-intensive process steps such as depressurisation, pressure build-up, dissolution of the polymers or polymer-stressing steps such as heating, melting as a process step. By adding or separating sc fluid or by altering the process parameters, it is possible to influence the phase behaviour during the production process.

The polymers prepared by the process; according to the invention comprise at least two, particularly three or more copolymerisable monomers, particularly preferably at least one monomer containing a further reactive group which is stable under the polymerisation conditions. As a result of the process according to the invention for preparing polymers in the homogeneous phase, a particularly favourable molecular weight distribution is obtained with a dispersity of preferably D<2. Such resins are also particularly suitable as powder coating binders.

Due to the use of sc fluid, the viscosities required for conducting the reaction may be lowered so that the polymerisation reaction may be carried out at low temperatures. This results in a mild process for the preparation of binders and polymers which may be further processed for various applications. These mixtures may be further processed as a polymer/sc fluid to powder coating without depressurisation of the sc fluid.

The powder coatings prepared according to the invention may be used, for example, as coating compounds for industrial coating where they may have decorative purposes and/or a protective effect, e.g., against corrosion. They may be used as clear coat or, if mixed e.g., with pigments or dyes, as a filler or base coat or top coat. The thickness of the coating may be from 10 to 250 μm, more particularly the coating thickness should be below 50 μm. The powder coatings prepared according to the invention are suitable for coating industrial articles, e.g., furniture, exterior wall coatings, electrical appliances and automotive parts.

EXAMPLE 1

Preparation of a Polymer Powder, Batchwise

A mixture of 15.0 g of hydroxypropyl methacrylate, 13.2 g of methyl methacrylate, 1.8 g of styrene, 2.5 g of dodecylmercaptan and 0.09 g of di-tert-butyl peroxide as initiator were mixed in an autoclave for 1 hour with 4.8 g of $CO_2$ (T=0° C., p=200 bar). The mixture was transferred to a pressure-stable reaction vessel preheated to 120° C. The reaction (T=120° C., p=350 bar, sc $CO_2$) started with the transfer of the mixture to the reaction vessel. The reaction mixture was homogeneous throughout the reaction. After 150 minutes the reaction was stopped by draining the reaction mixture from the reaction vessel, i.e. lowering the temperature to room temperature and depressurisation (about 13 wt-% $CO_2$ based on the reaction mixture).

The monomer conversion was 90%. The residual monomers and volatile constituents evaporated during depressurisation and evaporation of the $CO_2$ and a solid polymer was obtained. The polymer had an $M_N$ of 2900 g/mole, an $M_W$ of 4900 g/mole, and the polymolecularity index was 1.7. The OH value was 180 mg KOH/g of solid resin.

EXAMPLE 2

A mixture of 15.0 g of glycidyl methacrylate, 6.6 g of methyl methacrylate, 6.6 g of iso-bornyl methacrylate, 1.8 g of styrene, 2.5 g of dodecyl mercaptan and 0.09 g of di-tert-butyl peroxide as initiator were mixed in an autoclave for 1 hour with 4.8 g of $CO_2$ (T=0° C., p=200 bar). The mixture was transferred to a pressure-stable reaction vessel preheated to 120° C. The reaction (T=120° C., p=350 bar) started with the transfer of the mixture to the reaction vessel. The reaction mixture was homogeneous. After 240 minutes, the reaction was stopped by depressurising and draining the reaction mixture from the reaction vessel.

The monomer conversion was 90%. A solid powder was obtained. The polymer had an $M_N$ of 2600 g/mole, an $M_W$ of 4300 g/mole, and a polymolecularity index of 1.65. The Tg was about 30–50° C.

EXAMPLE 3

A mixture of 12.5 g of glycidyl methacrylate (GMA), 11.0 g of methyl methacrylate, 1.5 g of styrene, 2.1 g of dodecylmercaptan, 4.6 g of acetone and 0.15 g of azobisisobutyronitrile as initiator were mixed in an autoclave for 1 hour with 17.2 g of $CO_2$ (T=0° C., p=200 bar). The mixture was transferred to a pressure-stable reaction vessel preheated to 80° C. The reaction (T=80° C., p=1000 bar) started with the transfer to the reaction vessel. The reaction mixture was homogeneous, a state which could be ascertained by visual observation. After 140 minutes the reaction was stopped by depressurising and draining the reaction mixture from the reaction vessel (about 35 wt-% of $CO_2$ based on the reaction mixture).

The monomer conversion was 76%. Residual monomers, acetone and volatile constituents evaporated during depressurisation and evaporation of the $CO_2$ and a solid polymer was obtained. If necessary, the powder can be homogenised again with 10 g of $CO_2$ at 200 bar and 40° C. and depressurised again. The volatile constituents content is reduced in so doing. The polymer had an $M_N$ of 5600 g/mole and an $M_W$ of 7700 g/mole. The polymer contained 50.5 wt-% of reactive GMA units.

EXAMPLE 4

A mixture of 15.0 g of glycidyl methacrylate, 13.2 g of methyl methacrylate, 1.8 g of styrene, 2.5 g of dodecylmercaptan, and 0.09 g of azobisisobutyronitrile as initiator were mixed in an autoclave for 1 hour with 4.8 g of $CO_2$ (T=0° C., p=200 bar). The mixture was transferred to a pressure-stable reaction vessel preheated to 80° C. The reaction (T=80° C., p=300 bar) started when the reaction vessel was filled. The reaction mixture was homogeneous, a state which could be ascertained by visual observation. After 180 minutes the reaction was stopped by draining the reaction mixture from the reaction vessel, the pressure being lowered and the temperature reduced.

The monomer conversion was 90%. A solid polymer was obtained. The polymer had an $M_N$ of 4500 g/mole and an $M_W$ of 6100 g/mole and the polymolecularity index was 1.35. The polymer contained 50.6 wt-% of reactive GMA units.

EXAMPLE 5

A mixture of 15.0 g of glycidyl methacrylate, 13.2 g of methyl methacrylate, 1.8 g of styrene, 2.5 g of dodecylmercaptan, and 0.09 g of azobisisobutyronitrile as initiator were mixed in an autoclave for 1 hour with 4.8 g of $CO_2$ (T=0° C., p=200 bar). The mixture was transferred to a pressure-stable reaction vessel preheated to 100° C. The reaction (T=100° C., p=300 bar) started when the reaction vessel was filled. The reaction mixture was homogeneous, a state which could be ascertained by visual observation. After 180 minutes the reaction was stopped by depressurising to normal pressure and evaporating the $CO_2$.

The monomer conversion was 80%. The volatile constituents evaporated during depressurisation and evaporation of the $CO_2$ and a solid polymer was obtained. The polymer had an $M_N$ of 4400 g/mole and an $M_W$ of 6200 g/mole and a polymolecularity index of 1.4. The Tg was from 40 to 55° C.

EXAMPLE 6

A mixture of 10.0 g of glycidyl methacrylate, 17.2 g of methyl methacrylate, 1.7 g of isobornyl methacrylate, 1.3 g of styrene, 2.5 g of dodecylmercaptan, and 0.09 g of azobisisobutyronitrile as initiator were mixed in an autoclave for 1 hour with 10.0 g of $CO_2$ (T=40° C., p=200 bar). The mixture was transferred to a pressure-stable reaction vessel preheated to 100° C. The reaction (T=100° C., p=300 bar) started when the reaction vessel was filled. The reaction mixture was homogeneous, a state which could be ascertained by visual observation. After 100 minutes the reaction was stopped by draining the reaction mixture from the reaction vessel, the pressure being lowered and the temperature reduced (about 23 wt-% of $CO_2$ based on the reaction mixture).

The monomer conversion was 85%. The residual monomers evaporated during depressurisation and evaporation of the $CO_2$ and a solid polymer powder was obtained. The polymer contained 33.5 wt-% of reactive GMA units.

EXAMPLE 7

(Preparation of a Powder Coating, Continuous)

A polymer according to Example 2 was prepared. The reaction mixture with polymer was separated into two fluid phases by reducing the pressure to 150 bar. A phase (I) polymer/sc fluid and a phase (II) monomer/sc fluid was obtained. Phase (II) was separated and then discarded. 20 wt-% of an anhydride hardener (Additol VXL 11381, Vianova Resins AG) and 0.5 wt-% of a commercial light stabiliser (based on a sterically hindered amine) were added to phase (I), $CO_2$ was added in a quantity of about 35 wt-% (based on polymer/hardener) and the mixture was homogeneously mixed in a static mixer (T=100° C., p=150 bar). The viscous mixture was then depressurised by means of a high-pressure nozzle (d=0,8 mm) into a spray tower. The temperature in the spray tower was 35–40° C. A powder coating with an average particle size of about 25 µm was obtained.

EXAMPLE 8

A polymer according to Example 2 was prepared.

The reaction mixture with polymer was separated into two fluid phases by adding sc $CO_2$ (30 wt-% based on mixture): a phase (I) polymer/sc fluid and a phase (II) monomer/sc fluid. The temperature was reduced to 90° C. in so doing and phase (II) was separated and then discarded. Whilst maintaining the physical conditions, 20 wt-% of an anhydride hardener (Additol VXL 11381, Vianova Resins AG) and 0.5 wt-% of a commercial light stabiliser (based on a sterically hindered amine) were added to phase (I), $CO_2$ was added in a quantity of about 30 wt-% (based on polymer/hardener) and the mixture was homogeneously mixed in a static mixer (T=100° C., p=150 bar). The viscous mixture was then depressurised by means of a high-pressure nozzle (d=0,8 mm) into a spray tower. The temperature in the spray tower was 35–40° C. A powder coating with an average particle size of about 25 µm was obtained.

EXAMPLE 9

A polymer according to Example 2 was prepared and processed in a plant according to FIG. 2. The reaction mixture was separated into two phases by reducing the pressure to 150 bar in the separator A. A phase (I) polymer/sc fluid and a phase (II) monomer/sc fluid was obtained. Phase (II) which was enriched with monomers, was drawn off. Phase (I) was conveyed with a pump P1 to the static mixer M. An anhydride hardener was melted at a temperature of 120° C. in the preparation vessel V2. The melt of the hardener was conveyed to the static mixer with a pump P2. The pumps P1 and P2 were adjusted such that the mass flow ratio of polymer/hardener in the static mixer was 80/20. In addition, e-sc fluid in a mass ratio of 1:1 (based on mass of polymer plus mass of hardener) was conveyed from vessel V1 to the static mixer with a diaphragm compressor P3. The sc fluid was heated to 120° C. in the heat exchanger W. The mass flows were intensively mixed in the static mixer at 120° C. and 150 bar and the melt mixture containing $CO_2$ was depressurised with a hollow cone nozzle (bore 0.7 mm diameter, spray cone 90°) and a powder coating was obtained. A temperature of 42° C. was obtained in the spray tower S at a pressure of about 1 bar. The residual monomers contained in the polymer mixture were evaporated and drawn off together with the sc fluid with an exhauster P4. Entrained powder coating was separated from the sc fluid using a cyclone Z.

EXAMPLE 10

A polymer according to Example 2 was prepared and processed in a plant according to FIG. 3. The reaction mixture was transferred to an extraction column E whilst lowering the pressure to 150 bar. Monomers were removed from the polymer in the column at a pressure of 150 bar and a temperature of 120° C. by means of an sc fluid flowing in counter-current. At the top of the column the sc fluid was drawn off with the monomers dissolved therein. The sc fluid was separated from the monomers in the separator A by reducing the pressure to 50 bar. The purified sc fluid was compressed again by means of a compressor P5 and used again for extraction. At the bottom of the column E the polymer from which the monomers had been removed was drawn off and fed to a static mixer M by means of a pump P1. An anhydride hardener was melted at a temperature of 120° C. in the preparation vessel V2. The melt of the hardener was conveyed to the static mixer with a pump P2. The pumps P1 and P2 were adjusted such that the mass flow ratio of polymer/hardener in the static mixer was 80/20. In addition, sc fluid in a mass ratio of 1:1 (based on mass of polymer plus mass of hardener) was conveyed from vessel V1 to the static mixer with a diaphragm compressor P3. The sc fluid was heated to 120° C. in the heat exchanger W. The mass flows were intensively mixed in the static mixer at 120° C. and 150 bar and the melt mixture containing $CO_2$ was depressurised with a hollow cone nozzle (bore 0.7 mm diameter, spray cone 90°) and a powder coating was formed. A temperature of about 40° C. was obtained in the spray tower S at a pressure of 1 bar. The sc fluid was drawn off with an exhauster P4. Further powder coating was separated from the sc fluid using a cyclone Z.

What is claimed is:

1. A process for preparing a polymer powder comprising:
   (a) reacting at least two copolymerizable ethylenically unsaturated monomers with an initiator in the presence of a supercritical fluid having a critical temperature and a critical pressure to form a homogeneous reaction mixture containing at least one polymer, at least one of the at least two monomers and supercritical fluid, wherein said homogenous reaction mixture has a temperature and pressure above the critical temperature and critical pressure of the supercritical fluid;
   (b) separating the homogenous reaction mixture into at least two supercritical phases by adjusting at least one process parameter selected from temperature, pressure, supercritical fluid, and combinations thereof, said at least two supercritical phases comprising a supercritical phase I containing the at least one polymer and supercritical fluid and a supercritical phase II containing the at least one monomer and supercritical fluid;
   (c) separating said supercritical phase I from said supercritical phase II; and
   (d) converting said supercritical phase I into a polymer powder by depressurizing and removing the supercritical fluid from said supercritical phase I.

2. The process of claim 1 wherein the supercritical fluid is a non-reactive supercritical solvent.

3. The process of claim 1 wherein said reacting comprises at least three copolymerizable ethylenically unsaturated monomers, wherein at least one of the at least three copolymerizable ethylenically unsaturated monomers contains an additional functional group.

4. The process of claim 1 wherein said supercritical fluid comprises up to 20 wt % of an organic solvent.

5. The process of claim 1 wherein said pressure is between 80 to 450 bar and said temperature is between 70 to 250° C.

6. The process of claim 1, wherein said process is selected from a batchwise process and a continuous process.

7. The process of claim 1 wherein depressurizing the supercritical fluid causes a volatile accompanying substance to separate from said polymer powder.

8. The process of claim 1 further comprising purifying said supercritical phase I before said supercritical phase I is converted into a polymer powder in conversion step (d).

9. The process of claim 8 wherein a supercritical fluid is used in a counter-current extraction process in the purifying of said supercritical phase I.

10. The process of claim 1 wherein said supercritical phase II is recycled into said reacting step (a).

11. The process of claim 10 wherein the supercritical fluid is separated from said supercritical phase II before said supercritical fluid is recycled into said reacting step (a).

12. A process for preparing a powder coating comprising:
   (a) forming a polymer powder using the process of claim 1; and
   (b) processing said polymer powder to form said powder coating.

13. The process of claim 12 wherein said powder coating is formed using an extrusion process, an ultrasonic atomization method, a supercritical fluid, or a steam assisted micronization.

14. The process of claim 13 that further comprises the addition of at least one of a hardener, powder coating additive, dye, pigment, and extender.

15. A process for preparing a powder coating comprising:
   (a) reacting at least two copolymerizable ethylenically unsaturated monomers with an initiator in the presence of a supercritical fluid having a critical temperature and a critical pressure to form a homogeneous reaction mixture containing at least one polymer, at least one of the at least two monomers and supercritical fluid, wherein said homogenous reaction mixture has a temperature and pressure above the critical temperature and critical pressure of the supercritical fluid;
   (b) separating the reaction mixture into at least two supercritical phases by adjusting at least one process parameter selected from temperature, pressure, supercritical fluid, and combinations thereof, said at least two supercritical phases comprising a supercritical phase I containing the at least one polymer and supercritical fluid and a supercritical phase II containing the at least one monomer and supercritical fluid;
   (c) separating said supercritical phase I from said supercritical phase II;
   (d) processing said supercritical phase I by adding at least one additional powder coating component to form a supercritical phase I process mixture; and
   (e) converting the supercritical phase I process mixture to said polymer powder by depressurizing and removing the supercritical fluid from the process mixture.

16. The process of claim 15 wherein said separated supercritical phase I undergoes a further step of separating at least one accompanying substance.

17. The process of claim 15 wherein said at least one additional powder coating component is a hardener that reacts with functional groups of the polymer prior to said processing.

18. The process of claim 15 wherein at least one additive is added to the process mixture.

19. The process of claim 15 wherein said at least one additional powder coating component, before being added is homogenized in a supercritical fluid.

20. The process of claim 15 wherein the process mixture is sprayed by a nozzle into a spray tower or a liquid.

21. The process of claim 20 wherein said liquid is an aqueous medium.

22. The process of claim 20 wherein the supercritical fluid that is gaseous after spraying is purified and recycled in said process.

23. The process of claim 15 wherein said reacting comprises at least three copolymerizable ethylenically unsaturated monomers, wherein at least one monomer additionally contains further reactive functional groups, and wherein the dispersity of the polymer is <3.

24. A powder coating prepared by the process of claim 23, wherein said powder coating has an average particle size below 50 $\lambda$m.

25. The powder coating of claim 24 that is a powder clear coat.

26. The powder coating of claim 25 that is colored with at least one of a pigment or a dye.

* * * * *